United States Patent [19]

Neilson

[11] 4,178,045
[45] Dec. 11, 1979

[54] ABRASION RESISTANT BEARING SEAL
[75] Inventor: William J. Neilson, Whittier, Calif.
[73] Assignee: Smith International, Inc., Newport Beach, Calif.
[21] Appl. No.: 903,186
[22] Filed: May 5, 1978
[51] Int. Cl.² .................................................. F16C 19/00
[52] U.S. Cl. .................................. 308/8.2; 308/36.1
[58] Field of Search ................... 308/8.2, 36.1–36.5, 308/DIG. 13, 187, 187.1, 187.2; 277/94, 95

[56] References Cited
U.S. PATENT DOCUMENTS

| | | | |
|---|---|---|---|
| 3,251,634 | 5/1966 | Dareing | 308/8.2 |
| 3,381,968 | 5/1968 | Neilson | 308/36.2 X |
| 3,449,024 | 6/1969 | Lichte | 308/36.2 X |
| 4,102,419 | 7/1978 | Klima | 308/8.2 X |

Primary Examiner—Douglas C. Butler

[57] ABSTRACT

A bearing seal for cutters of rotary drill bits and big hole industrial cutters or tunneling machine cutters which comprises generally one or more steel rings in sealing relationship with the cutters and their journals, the relationship being maintained during the substantially continuous radial off-setting movement or angular cocking of the cutter relative to the journal in the normal operation of such devices, due to the clearance fit of the cutter on the journal.

12 Claims, 13 Drawing Figures

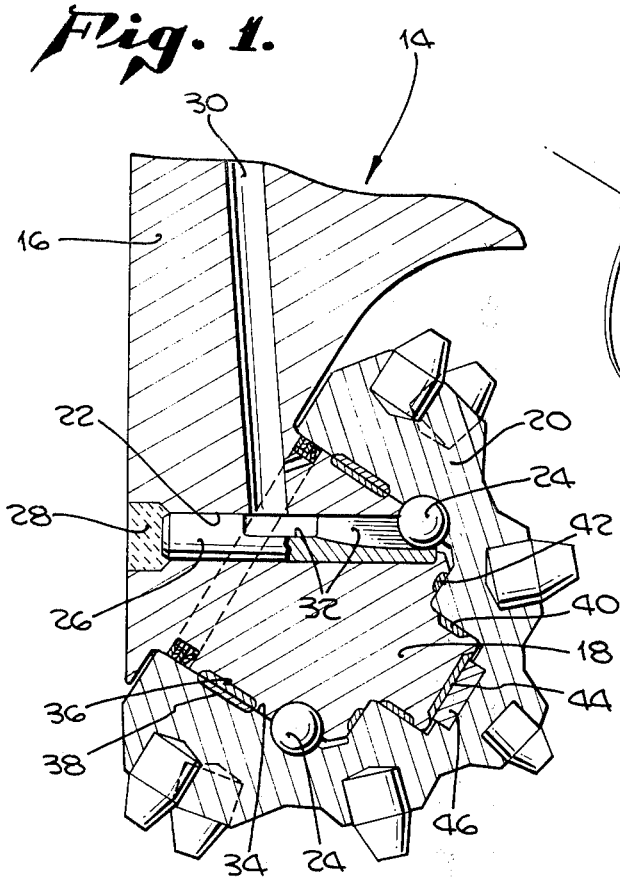
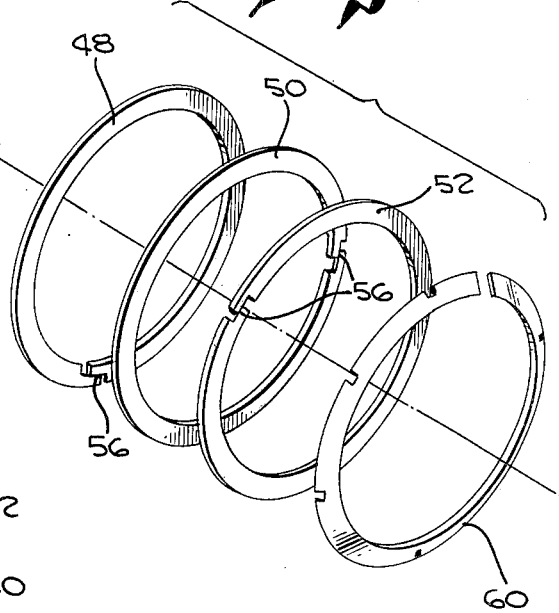
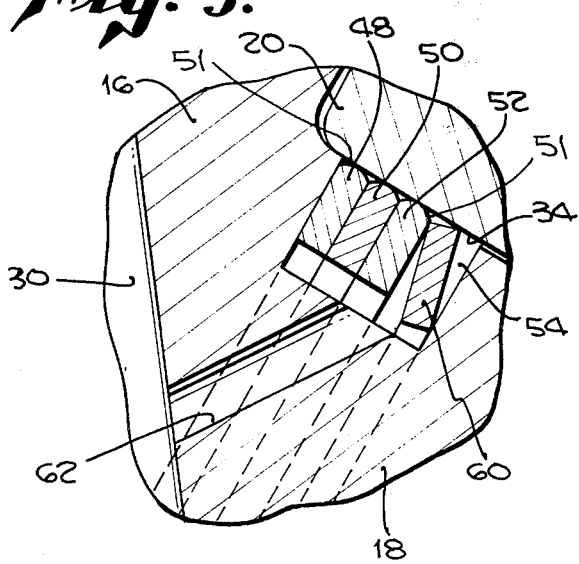
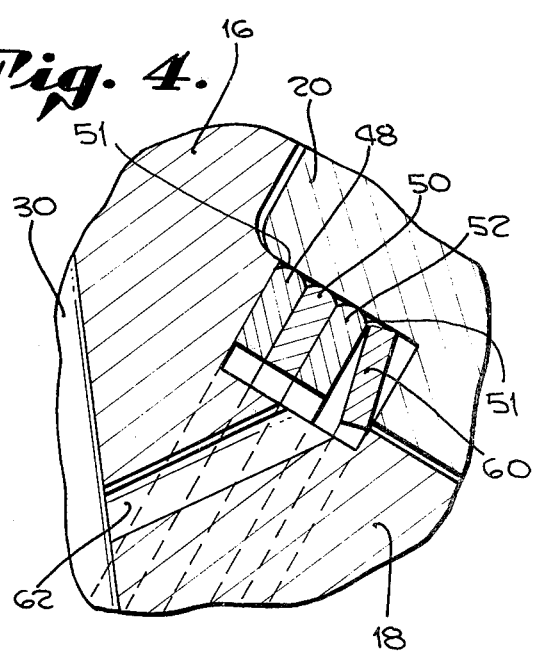

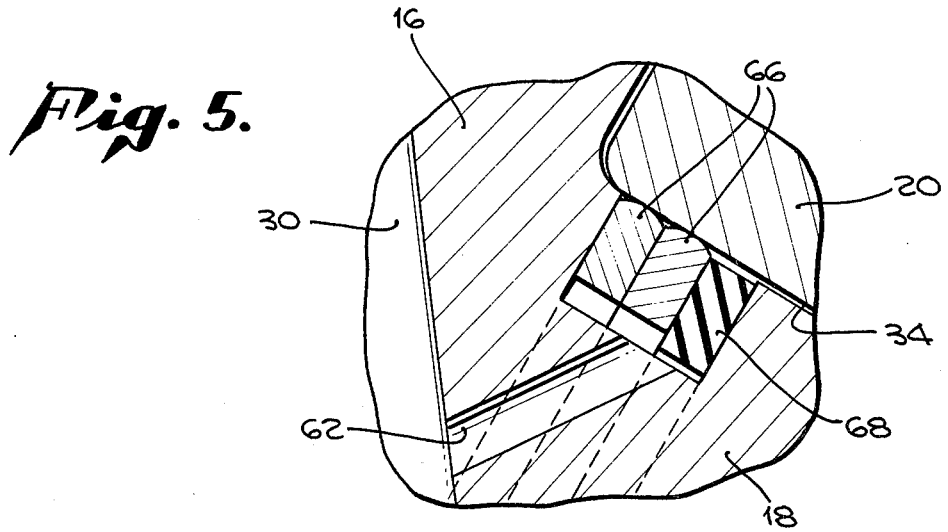
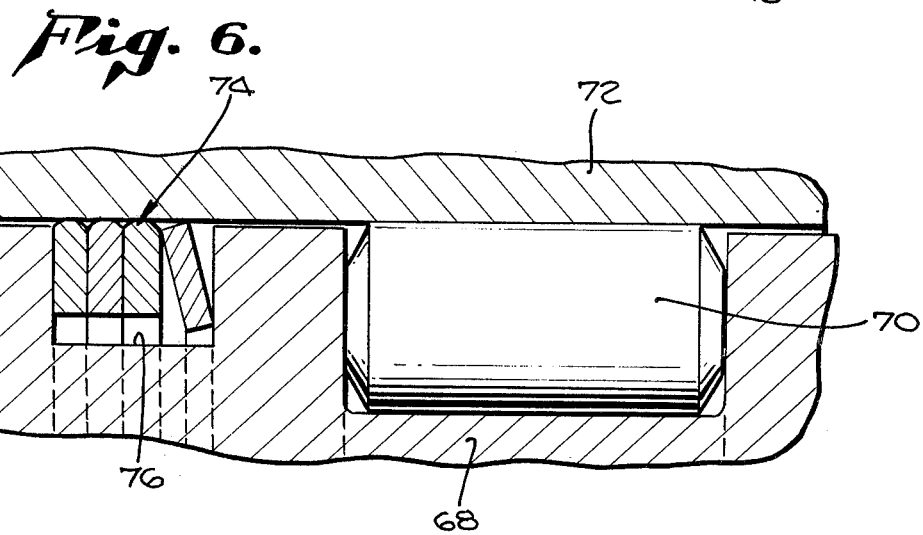
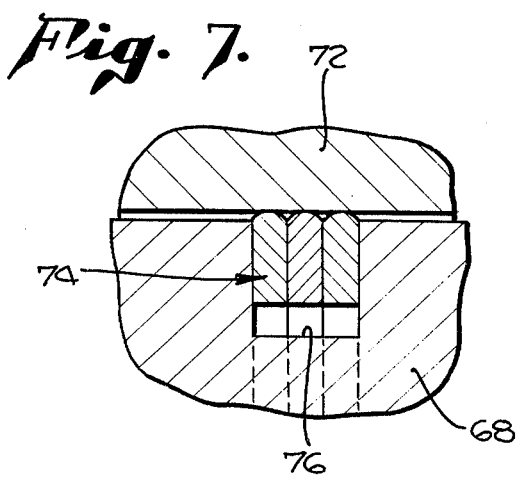
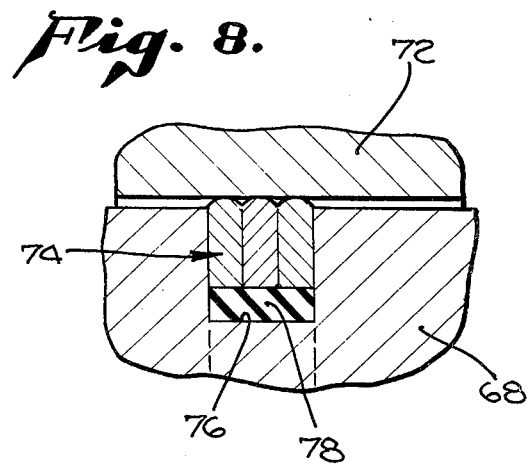

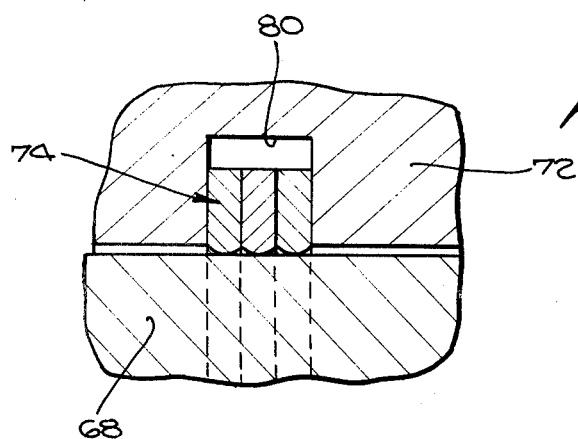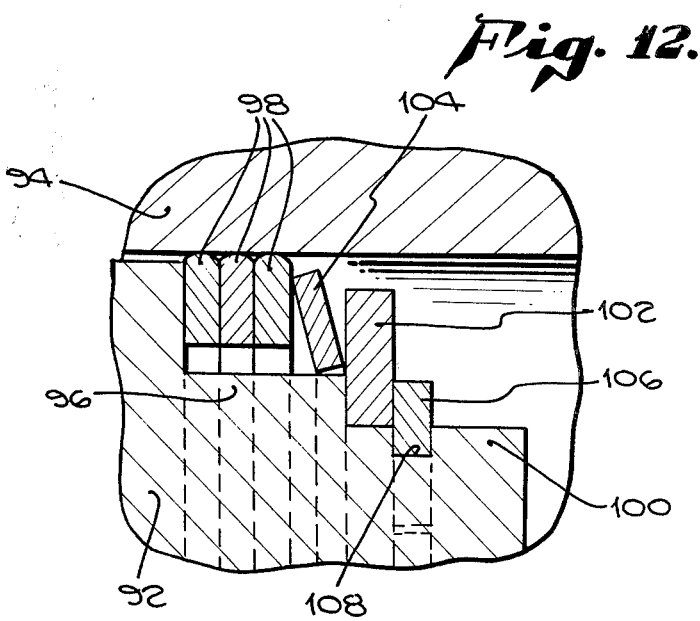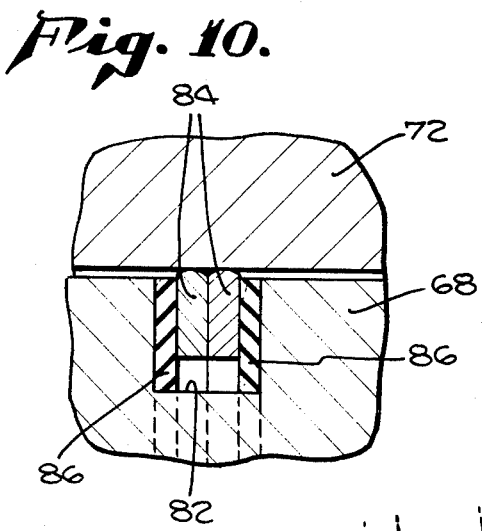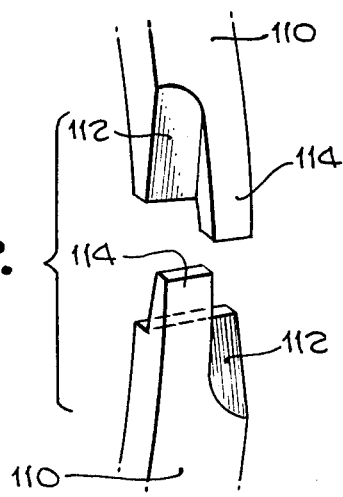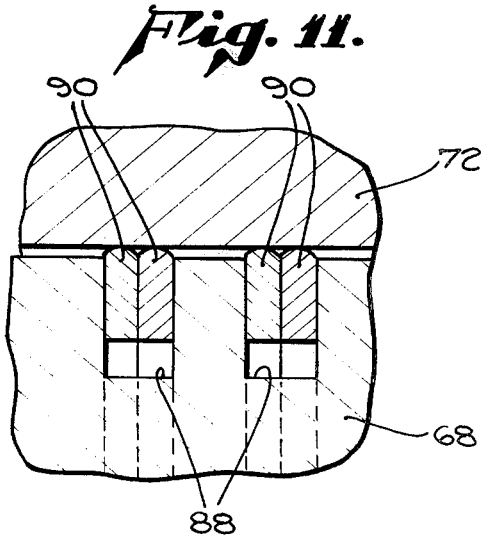

ABRASION RESISTANT BEARING SEAL

FIELD OF THE INVENTION

The seal arrangement is of particular advantage and value in drilling oil wells through rock formations with conventional rotary cone drill bits, big hole cutters and tunnel boring cutters. The cutters of many of such devices are lubricated through passages in the journal which communicate with the complementary bearing surfaces and bearing elements of the journal and the cutters.

Not only is it desirable to retain the lubricant against loss from the lubricant space provided by the clearance at the bearing area, but it is highly important to exclude abrasive drilling mud and formations particles from said bearing area.

In the drilling of oil wells with rock bits having rotary cone cutters, the life of the cutter bearing usually determines the life of the bit. When drilling thousands of feet below the surface, the trip time required to pull and disassemble the string of drill pipe, replace the bit, and reassemble and lower the string, is considerable. Each time the need for bit replacement is eliminated, thousands of dollars are saved.

Currently, seals of elastomeric material of the nature of O-rings are widely used. They can be made to perform efficient sealing functions, but they deteriorate relatively rapidly in the heat generated in a hole being drilled and their wear-resistant properties are considerably less than that of metal.

The present invention relates in part to the provision of bearing seal means for rotary cone cutter drill bits or the like which comprises one or more radially resilient split metal rings in sliding contact with each other and in sealing contact with the journal and the cutter which rotates thereon. The seal means is so arranged that this sealing relationship will be maintained even though the cutter is more or less continuously displaced radially and/or axially relative to the journal about which it rotates. Unlike an O-ring seal whose sealing pressure varies considerably about the 360 degree extent of the ring during radial movements of the cutter, this sea pressure remains constant with the metal sealing rings of the invention.

The invention relates also to the provision of one or more sealing rings having sealing surfaces of revolution respectively in sealing engagement with the journal leg and the rotary cone cutter of a drill bit, wherein the outer circumferential surface of revolution is transversely curved to maintain the sealing relationship during intermittent tilting of the rotary cutter on the journal.

The above objects of the invention will more fully appear from the following description in connection with the accompanying drawings, which illustrate the best mode of practicing the invention known to me at the present time.

FIG. 1 is a vertical sectional view through a portion of a rotary cone cutter drill bit with an embodiment of the invention incorporated therewith.

FIG. 2 is an exploded view of a sealing ring and spring arrangement. 360

FIG. 3 is an enlarged fragmentary sectional view through a portion of a drill bit journal, a cutter and the seal arrangement shown in FIG. 1 with the rings in sealing contact with the cutter and spaced radially from the journal.

FIG. 4 is a view similar to FIG. 3 with portions of the seal groove formed in the journal and in the cutter.

FIG. 5 is a view similar to FIG. 3 with only two sealing rings and with a rubber rather than metal spring.

FIG. 6 shows a fragmentary sectional view of my sealing arrangement adjacent a roller bearing in a journal shaft.

FIG. 7 is an enlarged fragmentary sectional view of three sealing rings in a groove in a shaft.

FIG. 8 is a view similar to FIG. 7 with the metallic rings backed by a rubber packing.

FIG. 9 is a view similar to FIG. 7 with the rings in a groove in a shaft housing and biased radially inwardly about a shaft.

FIG. 10 is a view similar to FIG. 7 with a pair of metal rings and a pair of packing rings at each side thereof.

FIG. 11 is an enlarged sectional detail of a pair of sealing rings in each of a pair of axially spaced grooves.

FIG. 12 is an enlarged fragmentary view showing an arrangement for replacement of the sealing rings axially at the end of a shaft.

FIG. 13 is an enlarged fragmentary detail of a type of overlap joint for a split sealing ring.

In the drawings there are illustrated portions of a drill bit designated generally at 14, conventionally with a plurality of journal legs 16 extending downwardly and inwardly extending journals 18 upon which are mounted rotary cone cutters 20. Only one journal leg, journal and rotary cutter is shown.

Portions of the journal leg 16 and journal 18 are provided with a generally horizontal bore 22 for the introduction of bearing balls 24 in a suitable race defined by complementary portions of the journal and the cone cutter. The bore 22 is then filled with a plug 26 and the plug is secured in place by a weld 28. A pressurized lubricant supply conduit 30 extends downwardly in the journal leg 16 from a pressurized lubricant under pressure through the bore to the bearing area of the rotary cone cutter 20 is provided for by relieving the plug 26 as shown at 32.

The cutter 20 is provided with a longitudinal bore 34 which normally accommodates the journal 18 with a clearance fit, to prevent seizing of the cutter on the journal under the heat generated in the bottom of the hole as well as to provide space for the introduction of lubricant. Customarily, the journal and an outwardly concentric portion of the bore of the cone cutter can be suitable case hardened or provided with complementary hard metal band areas 36 and 38 to assist in reducing wear. Also if desired, hard metal can be located at the smaller circumferential end portion of the journal at 40 and a hard metal annular thrust insert 42 can be provided to assist resisting thrust wear in conjunction with a hard metal journal end portion 44 which rotates against a thrust button 46 in the inner end portion of the rotary cone cutter cavity.

Drill bits usually operate in the hole bottom in an environment of drilling mud circulated into and out of the hole under pressure to remove the cuttings which have been chipped from the rock formation by the rotary cone cutters. These cuttings are of various sizes, down to fine particulate matter, and in suspension in the drilling mud they are highly abrasive. It is necessary to prevent ingress of the drilling mud and formation particles into friction and ballbearing areas of the journal and rotary cutter. At the same time it is equally important to retain the lubricant against escape to prevent the bearing material from drying out and ruining the bit.

O-rings and Belleville type metallic springs embedded in elastomers have been used. One of the major drawbacks of seals of those types, however, is the inability of the elastomeric material to stand up for considerable periods under the friction and heat generated as the bit proper and the rotary cone cutter rotate in the hole bottom and the cutter rotates on its journal. Therefore, as shown in the drawings I have provided seals comprising two or more flat metallic rings which not only serve efficiently as seals but have much longer effective lives than seals composed at least in part of elastomers.

FIGS. 1 and 3 illustrate one embodiment of the invention. In those views there are three metallic sealing rings 48, 50 and 52. They lie in an annular groove 54 formed in and about the cutter journal 18. The three rings, as shown in FIG. 2 are split at 56, and when mounted in the groove 54 are oriented so that the splits are preferably about 120 degrees apart. The rings of FIGS. 1 and 3, in their relaxed condition are of larger diameter than the rotary cutter bore 34 so that when the cutter is in place over the journal 18 and rings 48, 50 and 52, the rings are urged radially outwardly into sealing relationship with said bore 34.

The ring 48 is shown with its flat side wall in sealing engagement with a journal leg back face 58. The center ring 50 has its side walls in sealing engagement with the adjacent side walls of rings 48 and 52 respectively. Interposed between ring 52 and a wall of the groove 54 is a metallic spring element 60. This may be of any suitable type such as a Belleville spring or a flat wave spring. This spring not only holds the three rings in close sealing relationship but it also biases the sealing ring 48 against the journal leg rear face 58.

The flat side of the ring 48 which slides against the journal leg back face 58, and the contacting adjacent flat sides of rings 48, 50 and 52 maintain a sealing condition even though the rotary cutter 20 may shift radially relative to the journal 18, particularly after the friction bearing surfaces of the journal and the internal cutter 4 have worn and clearance between the rotary cutter and the journal has increased. This sealing relationship is also maintained even though there may be some axial movement of the cutter on the journal, by reason of the spring element 60.

Due to the clearance between the rotary cutter 20 and the journal 18, and because of the jarring shocks to which the tool is subjected in operation in rock, there is of course a slight degree of tilt of the rotary cutter 20 on the journal 18. For that reason I provide the rings 48, 50 and 52 with transversely curved circumferential edges 51. Thus, even though there is a slight angularity between the rotational axis of the cutter 20 and the longitudinal axis of the journal 18, the outer circumferences of the three rings 48, 50 and 52 will remain in sealing relationship with the cutter.

As best shown in FIG. 3, there is a branch lubricant supply conduit 62 leading from the main lubricant supply conduit 30 to the bottom of the annular sealing ring groove 54. Lubricant under pressure is therefore present in the groove 54 to assist in urging the rings 48, 50 and 52 toward the journal leg rear face 58 and also to supplement the radially outwardly bias of the rings against the rotary cone cutter bore 34. Clearly, it also serves to lubricate the sealing rings and the surfaces with which they are in contact.

FIG. 4 is a view quite similar to that of FIG. 3, but with a sealing ring groove formed partially in the journal 18 and partially in the cutter 20.

In FIG. 5 there is shown a seal assembly which includes a pair of sealing rings 66 and a static elastomeric ring 68 compressed between one of the rings 66 and an adjacent side wall of the sealing ring groove. It should be noted that the elastomeric ring 68 and the other elastomeric elements to be discussed in connection with FIGS. 8 and 10 are not exposed to the abrasive action of drilling mud or formation particles as is the case where elastomeric materials are used for the sealing rings themselves.

FIG. 6 shows an application of my sealing structure concept to an assembly such as that of an industrial cutter with a journal 68 having roller bearings 70 and about which a suitable cutter 72 rotates. A seal assembly generally indicated at 74, and of the same type as that of FIGS. 1 and 3, can be conveniently and efficiently located in a suitable sealing ring groove 76 in the journal 68.

FIG. 7 shows three sealing rings 74 in sealing contact with each other and with opposite side walls of a sealing ring groove 76. In this form there is no spring means urging the sealing rings in the axial direction because they completely fill the groove.

In FIG. 8 I illustrate the three sealing rings 74 with an inwardly concentric static elastomeric packing ring 78 in sealing contact with the inner circumferences of the sealing rings and with the bottom of the sealing ring groove.

FIG. 9 shows an industrial cutter element 72 with an inwardly open annular sealing ring groove 80 and with the rings 74 therein biased radially inwardly against the circumferential surface of the journal 68.

FIG. 10 shows the journal 68 provided with a sealing ring groove 72 having a pair of sealing rings 84 located axially between suitable packing rings 86 which may be of an elastomeric material.

FIG. 11 shows the journal 68 provided with a pair of sealing ring grooves 88 in each of which is a pair of metallic sealing rings 90 in sealing engagement with each other and with the side walls of the grooves 88. The outer circumferential surfaces of rings 90 are in sealing contact with the interior of the rotary cutter 72.

FIG. 12 shows an arrangement whereby the sealing rings can be removed and replaced over the end of a shaft or journal 92 having a cutter element 94 rotating thereabout. The journal 92 has a reduced end portion 96 about which resilient metallic sealing rings 98 are positioned to lie in sealing contact with the rotary cutter 94. The extreme end of the journal 92 has a second reduction 100 to permit the placement and removal axially of an anchoring ring 102 with a suitable axially acting spring ring 104 interposed between the anchoring ring 102 and the adjacent sealing rings 98. A split retaining ring 106 lies in a groove 108 to removably secure the anchoring ring 102 in position.

FIG. 13 shows an enlarged fragmentary detail of a split sealing ring 110 having overlapping projections 114 which extend into a pair of recesses 112 respectively, to close the ring gap.

It should be noted that in all the embodiments described above, the sealing ring groove is deeper radially than the ring assembly per se. This provides a radial space, either between the inner circumferences of the rings and the bottom of the groove in the journal, or the outer circumferences of the rings and the bottom of the groove in the rotary cutter. Because the cutter fits the journal with a clearance fit, radial movement of the cutter relative to the journal occurs constantly and allowance for that movement is provided by the additional groove depth. Thus, the cutter can move radially relative to the journal and the sealing rings will remain in sealing contact with each other, with an inwardly or outwardly radially facing portion of either the journal or the cutter, and with one adjacent side wall of the sealing ring groove. Only in the structure of FIG. 8 is the groove filled, and that is because of the elastomeric packing ring 78 which, while it fills the groove along the sealing rings 74, provides resilience to allow for the mentioned radial movement of the rotary cutter.

There are some conditions under which the pressure of the drilling mud in the hole exteriorly of the bit and its cutters is greater than the internal pressure of the lubricant. There might be fluctuations in the pressure differential of the drilling mud and the lubricant and at times the pressure may be equalized. Regardless of these variables, the sealing means will efficiently function to exclude the drilling mud and formation particles and contain the pressurized lubricant.

The rotary cutters or drill bits have a clearance fit when they are new. As the journal and rotary cutter bearing surfaces wear the relative clearance becomes greater and the cutter tilts to a greater angle relative to the axis of the journal. However, the curved surfaces on the sealing rings permit this angular displacement of the rotary cutters in frequently varying degrees while maintaining the proper sealing relationship between the rotating cutters and their journals.

It will of course be understood that various changes can be made in the form, details, arrangement and proportions of the various parts without departing from the spirit of the invention.

What is claimed is:

1. An earth boring tool for use in a down-hole environment of abrasive particles comprising:
   a rotary tool body,
   a journal carried by said body and having a friction bearing surface of revolution,
   a cutter rotatable on said journal with a clearance fit providing radial movement relative to said journal with predetermined radial limits, the cutter defining, with said journal, a lubricant space provided by the clearance fit,
   one of said journal and cutter having a circumferential seal gland comprising a groove with side walls and a bottom,
   said gland being located adjacent an axial limit of the cylindrical friction bearing surface of said journal,
   and resilient, radially expansible, axially immutable sealing ring means in said gland in sealing contact with a side wall thereof radially within the predetermined limits and having a circumferential surface in sealing contact with one of said journal and cutter,
   said sealing ring means comprising at least one ring having a greater radial cross-section than axial, with a side wall surface, most of which is in sealing contact with a side wall of said groove,
   the radial limit of movement of said sealing ring means while in sealing contact with said side wall being at least as great as the radial limit of clearance movement of said cutter.

2. The structure in claim 1, and said cutter being susceptible to a limited degree of tilting movement relative to said journal, and the circumferential surface of said sealing ring means being curved transversely to provide maintenance of sealing contact when the cutter is tilted.

3. The structure in claim 1, and said sealing ring means being split and overlapped at the split to maintain overlapped sealing contact surfaces radially and axially of the ring.

4. The structure in claim 1, and said sealing ring means including a ring element which, in cross-section, has a greater thickness radially than axially and having at least one axially facing flat side wall.

5. The structure in claim 1, and said sealing ring means comprising a pair of rings having flat facing side walls in sealing contact.

6. The structure in claim 5, and at least a portion of at least one of said journal and cutter defining a seal confine with a flat side wall, and at least one of said sealing rings being disposed in said confine with a flat side wall of the ring in flat sealing engagement with the flat side wall of said confine.

7. The structure in claim 6, and spring means in said confine biasing said rings toward said flat side wall of said confine.

8. The structure in claim 7, and said spring means comprising an annular metallic element.

9. The structure in claim 7, and said spring means comprising an elastomeric element between said sealing ring means and one of said journal and cutter.

10. The structure in claim 5, and said sealing ring means including a confine comprising an annular channel in at least a part of one of said journal and cutter, the channel being concentric to and open toward the other of said journal and cutter,
    and spring means interposed between a wall of said annular channel and said sealing ring means.

11. The structure in claim 5, and said journal having a lubricant supply conduit therein communicating with said seal gland.

12. The structure in claim 5, and said journal having a main lubricant supply therein communicating with the lubricant space between said cutter and said journal,
    and a branch conduit from said main lubricant supply conduit to said seal gland.

* * * * *